United States Patent
Bullard

(10) Patent No.: US 6,264,179 B1
(45) Date of Patent: Jul. 24, 2001

(54) SEAT ASSEMBLY UTILIZING MODULAR SPRINGS

(75) Inventor: Larry I. Bullard, Winston-Salem, NC (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 09/347,640

(22) Filed: Jul. 6, 1999

(51) Int. Cl.[7] .................................................. F16F 3/00
(52) U.S. Cl. ............................................... 267/102; 5/247
(58) Field of Search .................................. 267/102, 103, 267/104, 106, 107, 110, 111, 112; 5/247, 255, 268

(56) References Cited

U.S. PATENT DOCUMENTS

| | | |
|---|---|---|
| 2,685,330 | 8/1954 | Handren, Jr. et al. . |
| 2,815,797 | 12/1957 | Flint . |
| 2,856,989 | 10/1958 | Pawlikowski . |
| 2,934,133 | 4/1960 | Pawlikowski . |
| 3,098,244 | 7/1963 | Rothbauer, Jr. . |
| 3,681,794 * | 8/1972 | Ciampa et al. .......................... 5/247 |
| 3,888,474 | 6/1975 | Mandusky et al. . |
| 3,998,442 | 12/1976 | Keane et al. . |
| 4,228,991 | 10/1980 | Crosby . |
| 4,247,089 | 1/1981 | Crosby et al. . |
| 4,586,700 | 5/1986 | Crosby . |
| 4,597,566 | 7/1986 | Scrivner . |
| 4,606,532 | 8/1986 | Kazaoka et al. . |
| 4,657,231 | 4/1987 | Surletta . |
| 4,675,927 * | 6/1987 | Mizelle .................................... 5/247 |
| 4,709,906 | 12/1987 | Mizelle .................................. 267/103 |
| 4,973,032 * | 11/1990 | Fourrey et al. ....................... 267/106 |
| 5,253,851 * | 10/1993 | Fontana ................................ 267/102 |
| 5,615,869 | 4/1997 | Phillips et al. ....................... 267/103 |

* cited by examiner

Primary Examiner—Matthew C. Graham
(74) Attorney, Agent, or Firm—Wood, Herron & Evans, LLP

(57) ABSTRACT

The seat assembly of the present invention comprises a generally rectangular frame, a center rail, a plurality of modular springs secured to the frame and a wire grid secured to the modular springs. Each of the modular springs has a front section secured to the front rail of the rectangular frame, a resilient center section secured to the center rail and a rear section spaced above the frame and unattached to any of the rails. The front section of each modular spring is preloaded to increase the resilient support of the seat.

24 Claims, 6 Drawing Sheets

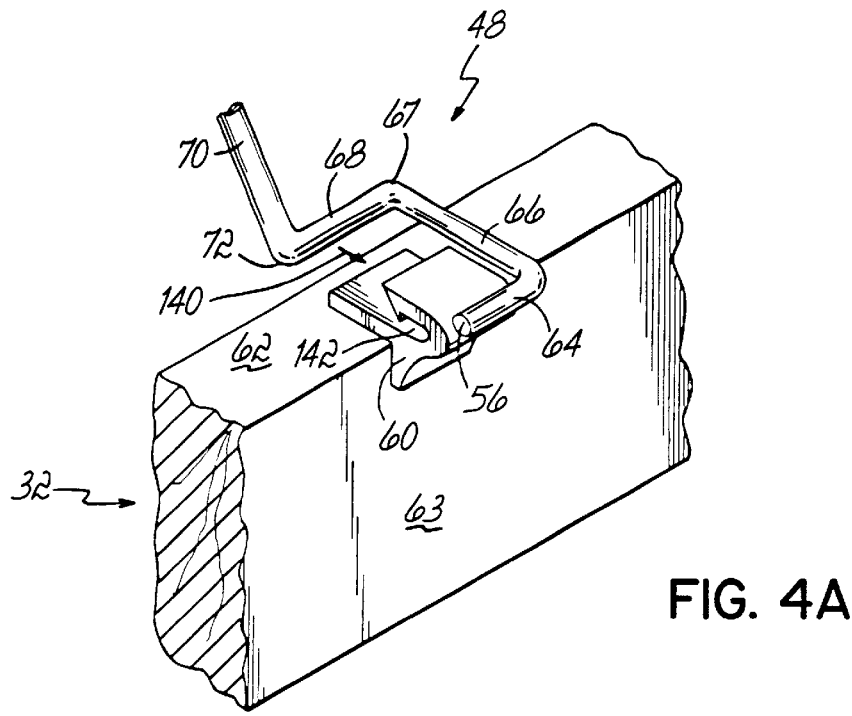
FIG. 4A
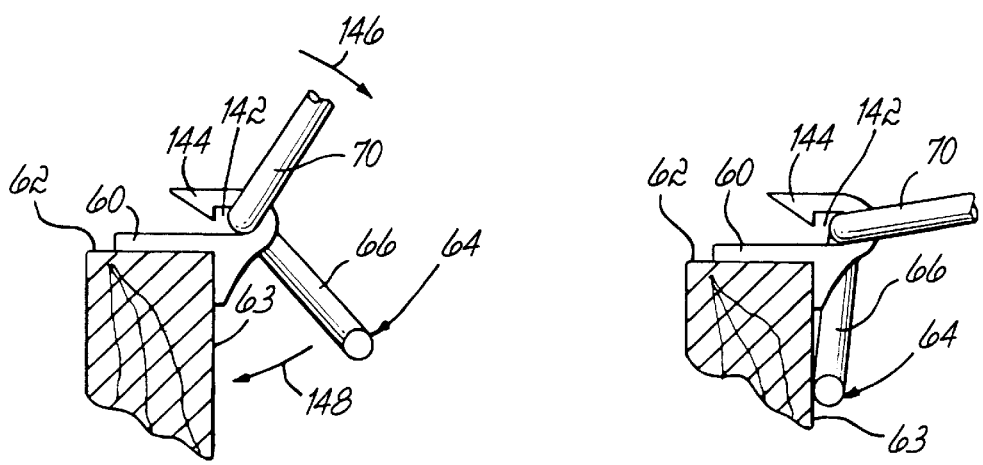
FIG. 4B
FIG. 4C

US 6,264,179 B1

SEAT ASSEMBLY UTILIZING MODULAR SPRINGS

FIELD OF THE INVENTION

This invention relates to seat assemblies which are used in items of furniture such as love seats and couches. More particularly this invention relates to a seat assembly utilizing modular springs rather than conventional coil springs.

BACKGROUND OF THE INVENTION

Seating products utilizing modular springs which extend between the front and back rails of a generally rectangular seating frame are known. Such modular springs are conventionally attached at the front end to the front rail and attached at the back end to the rear rail. Additionally, each modular spring is bowed between the front and rear rails so as to provide a desired degree of resiliency in the seating product. The ends of each modular spring are secured to the frame rails with any of a number of mechanisms, the most common being clips secured to the front and back rails of the generally rectangular frame into which the ends of the modular springs are inserted. These modular springs may either be sinuous springs such as are disclosed in U.S. Pat. Nos. 4,247,089 and 4,586,700, or irregularly shaped springs such as are disclosed in U.S. Pat. Nos. 2,856,989 and 2,934,133.

Oftentimes, due to the distance between the front and rear rails of the seating frame (the distance the modular springs must span), it is desirable to support the center of the modular springs. U.S. Pat. Nos. 4,247,089 and 4,586,700 disclose wire members which pass diagonally under bowed sinuous springs to which are attached support members midway between the front and rear rails in order to better support the arched sinuous wires extending between the front and rear rails of the seating frame.

Rather than using a wire member passing diagonally underneath the sinuous springs spanning the length of the seating product, several seating assemblies have a frame including a center support member extending generally parallel the front and rear frame rails which is secured to a pair of opposed side rails of the frame. U.S. Pat. Nos. 2,856,989 and 2,934,133 disclose such a center support rail. In each of these patents a portion of the modular springs spanning the length of the seating product, i.e., from the front rail to the rear rail, also has a downwardly extending portion which is supported by the center rail.

Another patent which discloses a frame having at least one center rail parallel the front and rear rails is U.S. Pat. No. 5,61 5,869.

This patent discloses a pair of intermediate rails parallel the front and rear rails of the frame. A plurality of modular springs extend between the front and rearmost intermediate rail rather than between the front and back rails of the frame. A plurality of conventional coil springs secured to the forwardmost intermediate rail of the frame provide additional support to the user. These coil springs extend upwardly from the forwardmost intermediate rail and are secured to a pair of lateral wires which are secured to the modular springs as well. Because the spring assembly disclosed in U.S. Pat. No. 5,615,869 utilizes both modular springs and conventional coil springs, and additionally includes two intermediate rails extending parallel the front and back rails of the frame, it is expensive and time consuming to manufacture and assembly this spring assembly.

Therefore, it has been one objective of the present invention to provide a seat assembly for use in furniture and the like which utilizes a minimum number of components and which may be quickly and easily assembled in order to make the seat assembly.

It has further been an object of the present invention to provide a seat assembly utilizing modular springs which have a resilient center section secured to an intermediate rail of a generally rectangular frame, without the rear end of the modular spring being secured to the rear rail of the frame, thereby minimizing assembly and manufacturing costs and maximizing seating comfort of the resulting product.

It has further been an object of the present invention to provide a seating assembly which may be modified slightly in order to manufacture seats of differing lengths.

SUMMARY OF THE INVENTION

The invention of this application which accomplishes these objectives comprises a seat assembly having a generally rectangular frame and a plurality of modular springs secured to the frame.

The generally rectangular frame includes a front and rear rail, a pair of opposed side rails generally perpendicular the front and rear rails. A center rail extends between the opposed side rails and is generally parallel the front and rear rails. In addition, the frame may include at least one stretcher rail, each stretcher rail extending between the front and rear rails and being generally parallel the opposed side rails of the frame.

A plurality of modular springs are secured to the frame. Each of the modular springs is made of one piece of wire and has a front section, a front connecting section, a resilient center section and a rear cantilevered unsupported section. The front section is secured to the front rail of the frame. Preferably the front section of each modular spring is engaged with a clip secured to the front rail of the frame, but any other means of attachment may be used as well.

The front connecting section extends between the front section and the resilient center section is generally planar and has a generally square wave form configuration.

The resilient center section of each modular spring comprises a pair of opposed legs which converge at a bottom bar of the modular spring.

The resilient center section of the modular spring is secured to the center rail. More particularly, the bottom bar of the modular spring is either stapled directly to the center rail of the frame or secured to a clip which is secured to the center rail of the frame in order to secure the center rail of the frame and the resilient center section of the modular spring together.

Extending rearwardly from the resilient center section is a generally planar cantilevered unsupported rear section of the modular spring. This rear section is spaced above the frame and unattached to any of the rails of the frame. Overall, and particularly between the resilient center section and front section of the modular spring, the modular spring has a generally square wave form comprising a plurality of transverse bars and plurality of longitudinal bars.

In order to provide increased stability and strength, a stiffener may be secured to the resilient center section of the modular spring. The stiffener extends between the opposed legs of the resilient center section of the modular spring and is clipped thereto with conventional three-pronged clips. Other methods of attachment may be used as well.

The last component of the seat assembly of the present invention is a wire grid comprising a plurality of intersecting members secured to the generally planar portions of the modular springs. More particularly, the grid is secured to the generally planar portions of the modular springs with conventional three-pronged clips but may be secured to the modular springs using any other fastener.

When constructing the seat assembly of the present invention, the front section of each modular spring is secured to the front rail before the resilient center section of the modular spring is secured to the center rail and pretensioned against the inside surface of the front rail when the spring is pulled downwardly and secured to the center rail of the frame. This pretensioned front edge of each modular spring increases the resilient support at the front of the seat assembly.

These and other objects and advantages of the present invention will be more readily apparent from the following drawings.

BRIEF DESCRIPTION OF THE DRAWINGS

FIG. 4A is an enlarged perspective view of a portion of the resilient front section of one of the modular springs of the present invention illustrating how the spring is moved into engagement with a clip secured to the front rail of the frame of the present invention.

FIG. 4B is side elevational view of the portion of resilient front section of the modular spring of FIG. 4A but illustrating the spring fully engaged with the clip secured to the front rail prior to pretensioning of the spring.

FIG. 4C is a view of the portion of resilient front section of the modular spring of FIGS. 4A and 4B in a fully preloaded condition.

DETAILED DESCRIPTION OF THE INVENTION

Figure 1:
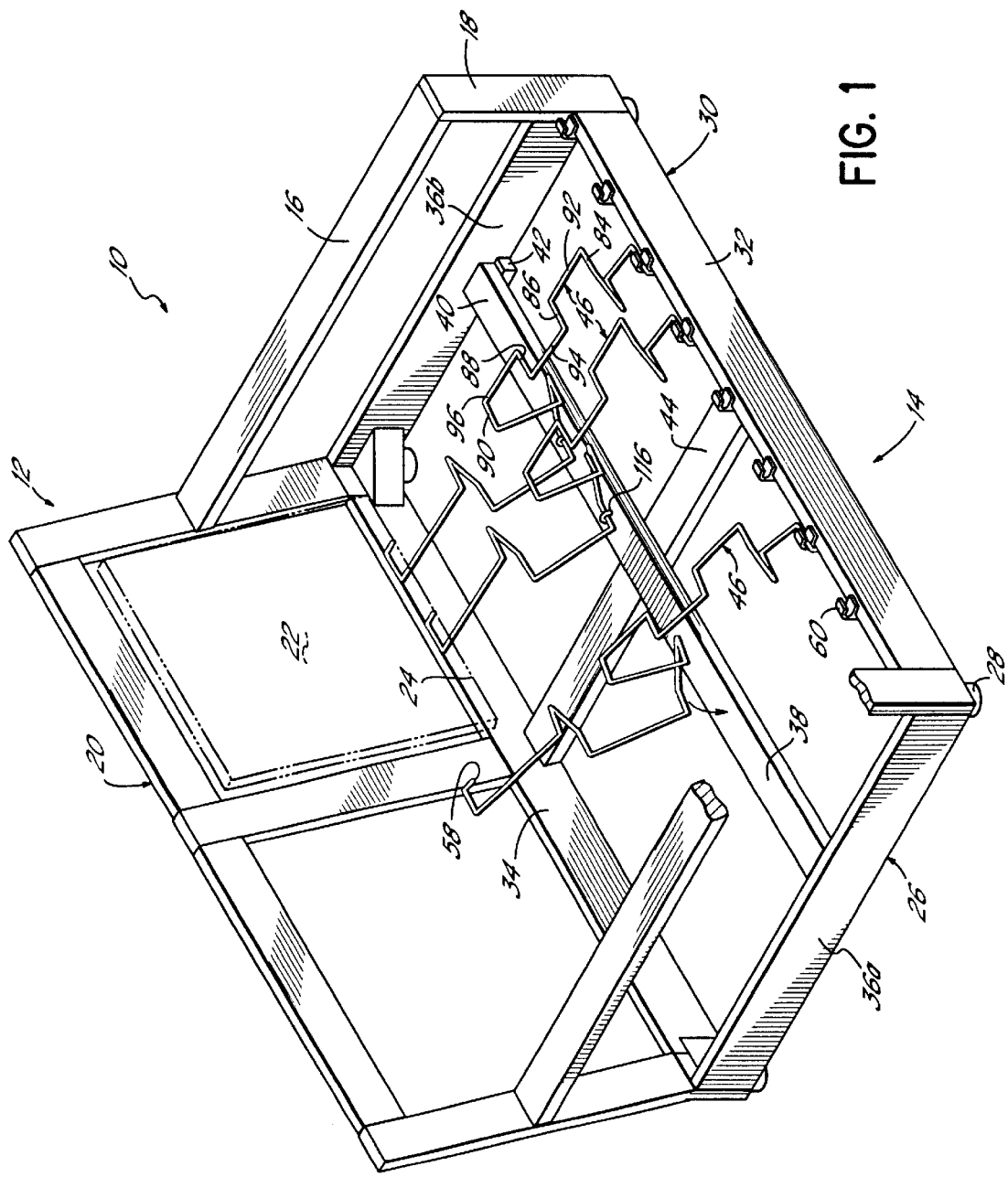
FIG. 1 is a perspective view of the seat assembly of the present invention before the grid illustrated in FIG. 2 is added.

Referring to FIG. 1, there is illustrated a seating product 10 having a wooden frame comprising a backrest section 12 and a seat section 14. A pair of armrests 16 extend outwardly from the backrest frame section 12 and are supported by armrest supports 18 which are connected to the seat section 14 of the seating product 10.

The backrest section 12 comprises a rectangular frame 20 in the illustrated embodiment, and a pair of backrest frame panels 22 secured to the frame 20. The backrest panels each include a resilient sinuous spring assembly but may include any other type of resilient spring assembly or structure. At the bottom of each panel is a breast rail 24. The present invention is not intended to limit the structure of the backrest and may be used with any type of backrest.

The seat section of the seating product comprises a seat assembly 26 which is raised slightly off the floor or supporting surface by four or more floor supports 28. The seat assembly 26 comprises a generally rectangular frame 30 including a front rail 32, a rear rail 34 and a pair of opposed side rails 36a,36b. The seat assembly 26 further comprises a center rail 38 extending between the opposed side rails 36a,36b and being generally parallel the front and rear rails of the frame.

Opposed ends 40 of the center rail 38 rest upon cleat blocks 42 which are secured to the inside surface of the side rails 36a,36b. The center rail 38 may be secured to the side rails in any number of other ways as well as with the use of cleat blocks. This application is not intended to limit the type of securement of the center rail to the opposed side rails of the frame.

One last component of the seat frame 20 is a stretcher rail 44 which extends between the front and rear rails 32,34 generally parallel the opposed side rails 36a,36b. The seat assembly 26 may have any number of stretcher rails, although only one stretcher rail is illustrated in FIG. 1. Typically, one stretcher rail is used for a love seat, and two stretcher rails are used for a conventional sofa. The stretcher rail 44 may be secured to the front and rear rails using any number of fasteners or mechanisms.

The seat assembly 26 of the present invention further comprises a plurality of modular springs 46 which extend generally parallel the side rails of the frame. Each of the modular springs 46 is secured to the front and center rails of the frame but is not attached to the rear rail of the frame.

Figure 2:
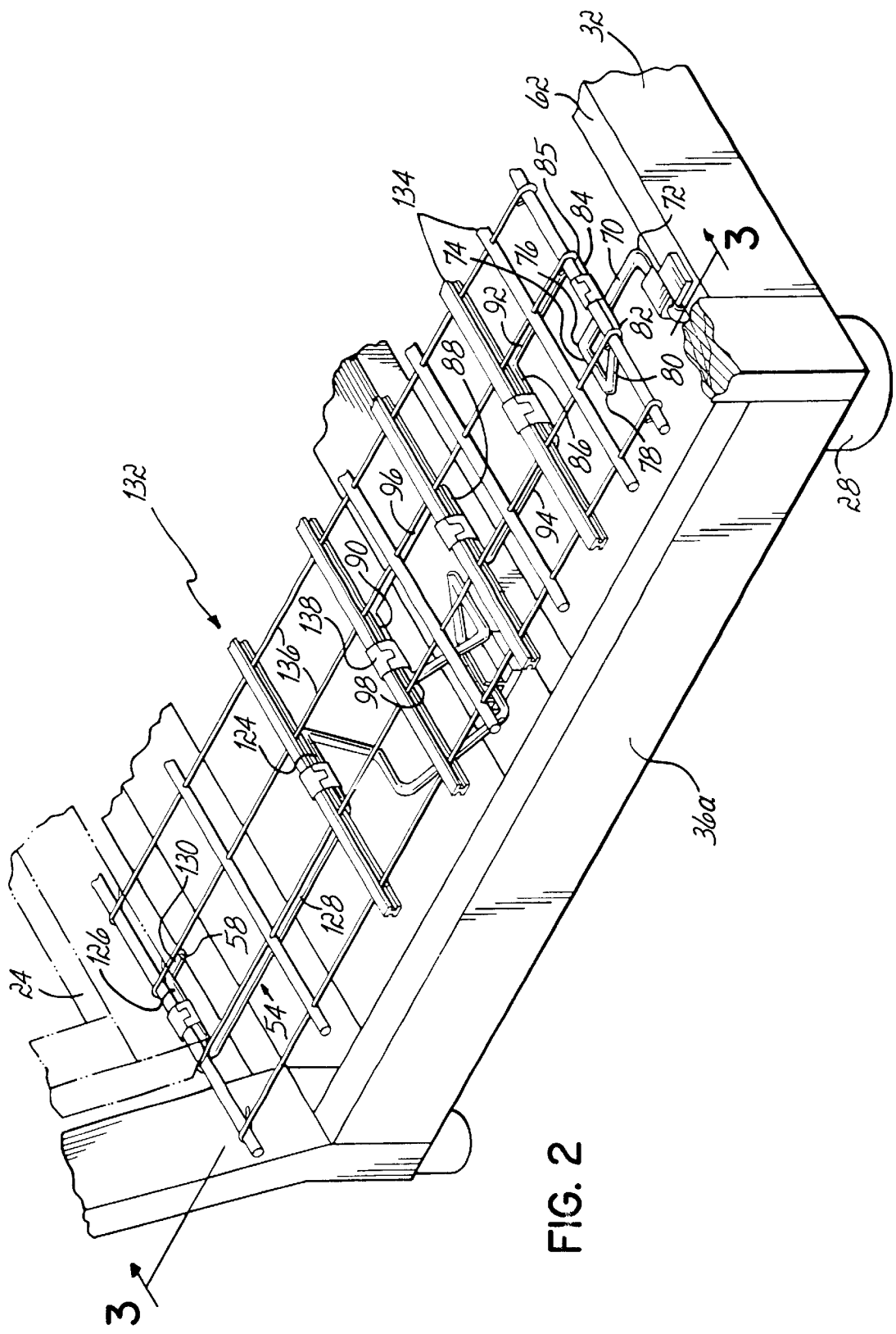
FIG. 2 is a partial perspective view of a seat assembly having incorporated therein a wire grid.
Figure 3:
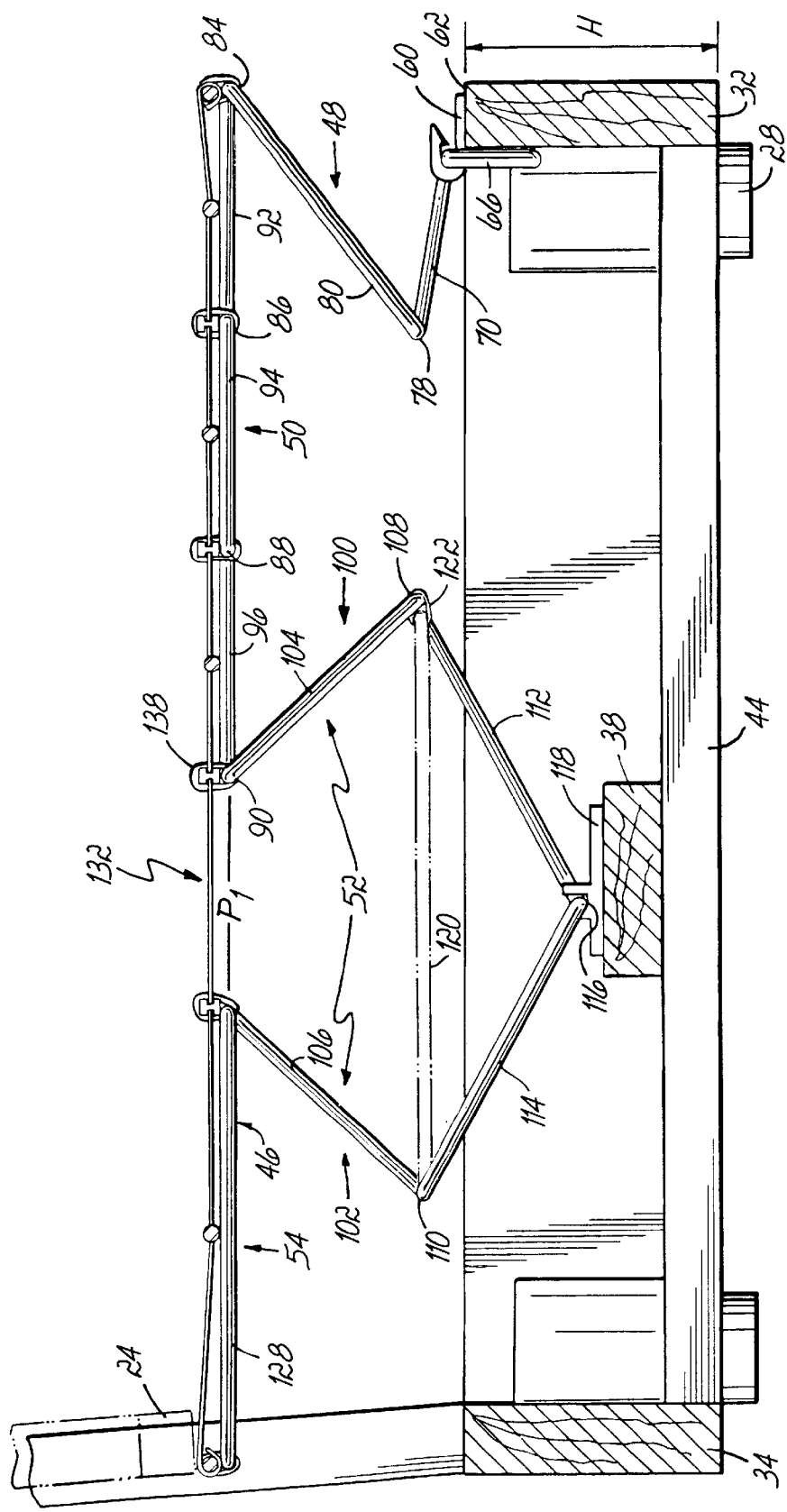
FIG. 3 is a view taken along the line 3—3 of FIG. 2.

As best illustrated in FIG. 3, each modular spring 46 comprises a resilient front section 48, a front connecting section 50, a resilient center section 52 and a rear section 54. The front connecting section 50 and rear section 54 are generally planar lying substantially in a horizontal plane $P_1$. As best illustrated in FIGS. 4A–4C, the resilient front section 48 terminates in a front end 56. Similarly, as best illustrated in FIGS. 1 and 2, the rear section 54 terminates in a rear end 58. Each modular spring 46 is made of a single length of wire and has a generally square wave form extending between the front end 56 and the rear end 58 of the modular spring. Except for the resilient front section and the resilient center section, each modular spring is generally planar.

As best illustrated in FIGS. 1 and 3, the resilient front section 48 of the modular spring 46 extends downwardly from the front connecting section 50 and is secured to the front rail 32 of the frame 30. The resilient front section 48 is preferably engaged with a generally U-shaped clip 60 which is secured to an upper surface 62 of the front rail 32. Although the resilient front section of each modular spring is secured to the front rail with a clip in the drawings of this application, other means, such as staples, may be used to secure the resilient front section of each modular spring to the front rail of the frame.

As best illustrated in FIGS. 4A–4C, the resilient front section 48 of each modular spring comprises an end bar 64, a first longitudinal bar 66 and a first transverse bar 68 extending inwardly from junction 67. A second longitudinal bar 70 extends upwardly from junction 72 and terminates at junction 76. As best illustrated in FIG. 2, a second transverse bar 74 extends horizontally from junction 76 and terminates at junction 78.

From junction 78 a third longitudinal bar 80 extends upwardly and terminates at a junction 82. From junction 82, a third transverse bar 84 extends horizontally and terminates at junction 85. At junction 85 the resilient front section 48 ends and the front connecting section 50 begins.

As best seen in FIGS. 1 and 2, the front connecting section 50 of each modular spring 46 comprises three transverse bars 86,88 and 90, connected by longitudinal bars 92,94 and 96, respectively. At the end 98 of transverse bar 90 the front connecting section 50 ends and the resilient center section 52 begins. The front connecting section 50, unlike the resilient front and center sections 48,52, is generally planar, lying substantially in plane $P_1$.

As most clearly illustrated in FIG. 3, the resilient center section 52 extends downwardly from the plane $P_1$ of the rear and front connecting sections and is secured at its lowermost point to the center rail of the frame. The resilient center section 52 has a pair of opposed legs 100 and 102. Each leg 100,102 comprises an upper leg bar 104,106, respectively, a middle transverse bar 108,110, respectively, and a lower leg bar 112, 114, respectively. The upper and lower leg bar of each leg are joined to opposite ends of the middle bar 108, 110. The remaining and lowest portion of the resilient center section 52 is a bottom bar 116 which is secured to the center rail 38. The lower leg bars 112,114 of opposite legs 100,102 are joined to opposite ends of the bottom bar 116. FIG. 3 illustrates the bottom bar 116 being secured to a clip 118 which is secured to the center rail 38 of the frame. However, as illustrated in FIG. 1, the bottom bar 116 of each modular spring 46 may be stapled or otherwise secured to the center rail 38 of the frame.

As illustrated in FIG. 3, a stiffener 120 may be secured to the middle bars 108,110 of legs 100,102 with clips 122. The stabilizer 120 may be a rigid bar as illustrated in FIG. 3 in order to prevent the middle bars 108, 110 of legs 100, 102 from spreading apart a distance greater than the length of the stiffener. Alternatively, the stiffener 120 may assume other forms such as wire links in order to prevent the legs 100, 102 from separating when a load is placed on the modular spring 46. The stiffener 120 may alternatively be an elastic device such as a web strap or a sinuous wire which allows limited movement of the middle bars 108, 110 of legs 100, 102. Regardless, the stiffener 120 is an optional component of the invention and may be omitted if desired.

As best seen in FIGS. 2 and 3, the rear section 54 of each modular spring comprises a pair of transverse bars 124 and 126 connected by a longitudinal bar 128. The longitudinal bar 128 has a length greater than the length of the transverse bars 124,126. Extending forwardly from the transverse bar 126 is an end bar 130 terminating in the rear end 58 of the modular spring. Although one configuration of the rear section of the modular spring is illustrated and described which is generally planar and a square wave form, other configurations of rear section may be utilized in accordance with the present invention.

As illustrated in FIGS. 2 and 3, the last component of the seat assembly of the present invention is a wire grid 132 comprising a plurality of transverse members 134 intersecting with a plurality of longitudinal members 136. The transverse and longitudinal members 134,136 may be welded or otherwise secured to one another to complete the grid 132. The grid 132 is secured to the modular springs 46 by means of a plurality of clips 138 which are joined to the transverse bars of the front connecting section 50 and rear section 54 of the modular springs. Other attachment mechanisms other than conventional three-prong wire clips may be used as well. The grid may extend substantially the entire length and width of the seat assembly of the present invention as illustrated in FIG. 2, or alternatively, may extend for only a portion thereof. Additionally, the spacing between adjacent transverse or longitudinal members of the grid may be varied.

FIGS. 1 and 4A–4C illustrate the method of joining the modular springs to the frame of the seat assembly which results in preloaded modular springs. As illustrated in FIG. 4A, the first transverse bar 68 of the resilient front section 48 of a modular spring 46 is moved in the direction of arrow 140 into the hollow interior 142 of the clip 60. The clip 60 is secured to the upper surface 62 of the front rail 32. Each clip 60 has a hook 144 which keeps the first transverse bar 68 within the interior recess 142 of the clip 60.

As illustrated in FIG. 4B, with the front transverse bar 68 so engaged, the modular spring 46 is moved downwardly in the direction of arrow 146 causing the end bar 64 to move in the direction of arrow 148 into engagement with the inside surface 63 of the front rail.

Thereafter, the modular spring 46 is moved further downwardly while the end bar 64 is engaged with the inside surface of the front rail, thereby prestressing the resilient front section 48 of the modular spring. This prestressing of the resilient front section 48 of the spring provides additional front resilient support to the spring, which is greater than the support which would be provided absent this prestressing.

With the resilient front section 48 of the modular spring 46 prestressed and in the position illustrated in the FIG. 4C, the bottom bar 116 of the resilient center section 52 of the modular spring 46 is secured to the center rail 38 of the frame, thus maintaining the pretensioning of the resilient front section of the spring.

The pretensioned front section of the modular spring increases the resilient support of the front portion of the seat while maintaining a solid but resilient foundation in the middle of the seat where the center rail is located. Thus, the seat assembly of the present invention provides increased resilient support in the front and middle sections of the seat by maintaining the rear section of spring cantilevered from the middle section and unsupported at the rear and allows the rear portion of the seat increased resiliency, thereby providing a more comfortable seat.

Figure 5:
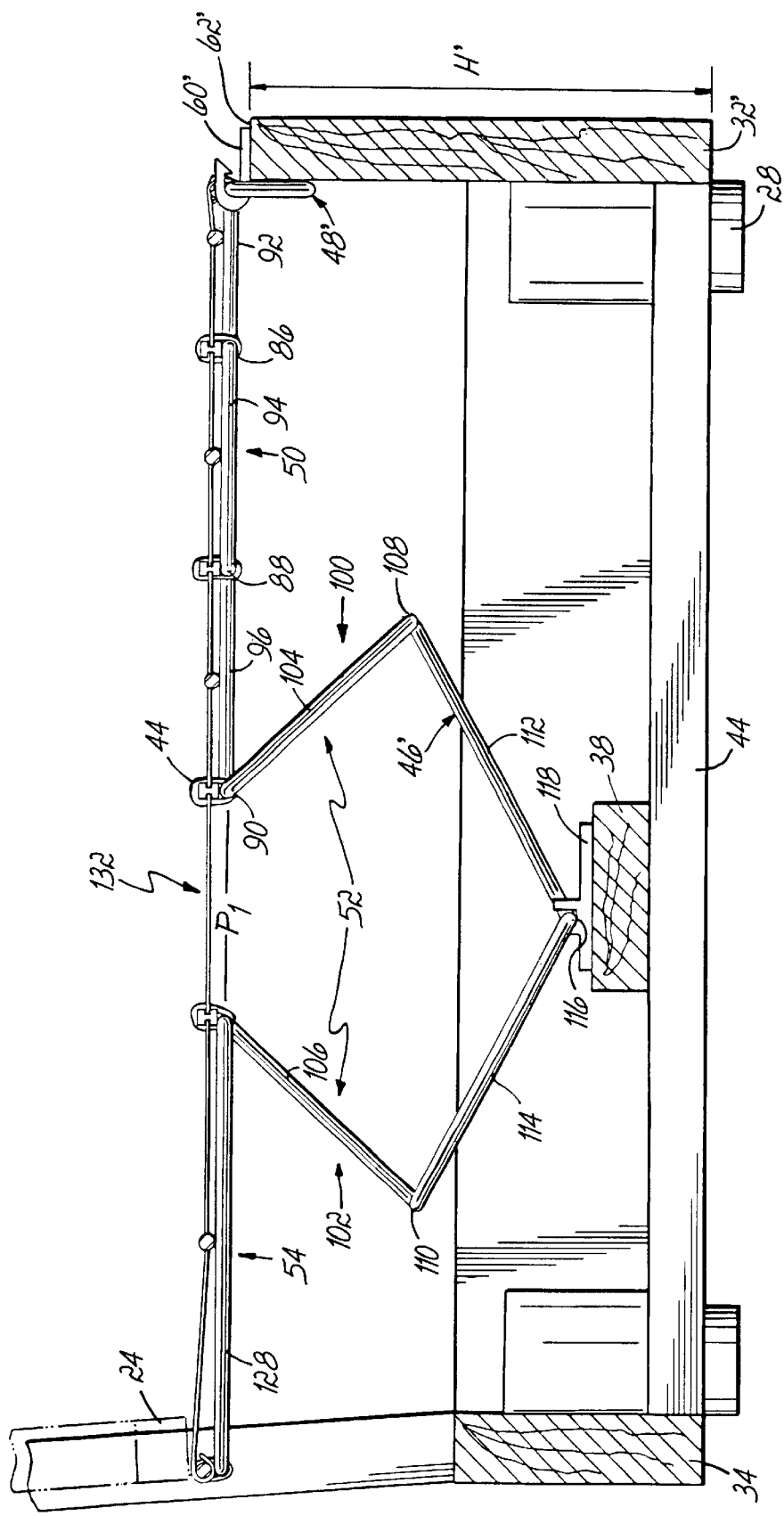
FIG. 5 is a view like FIG. 3 illustrating an alternative embodiment of the present invention.
Figure 5A:
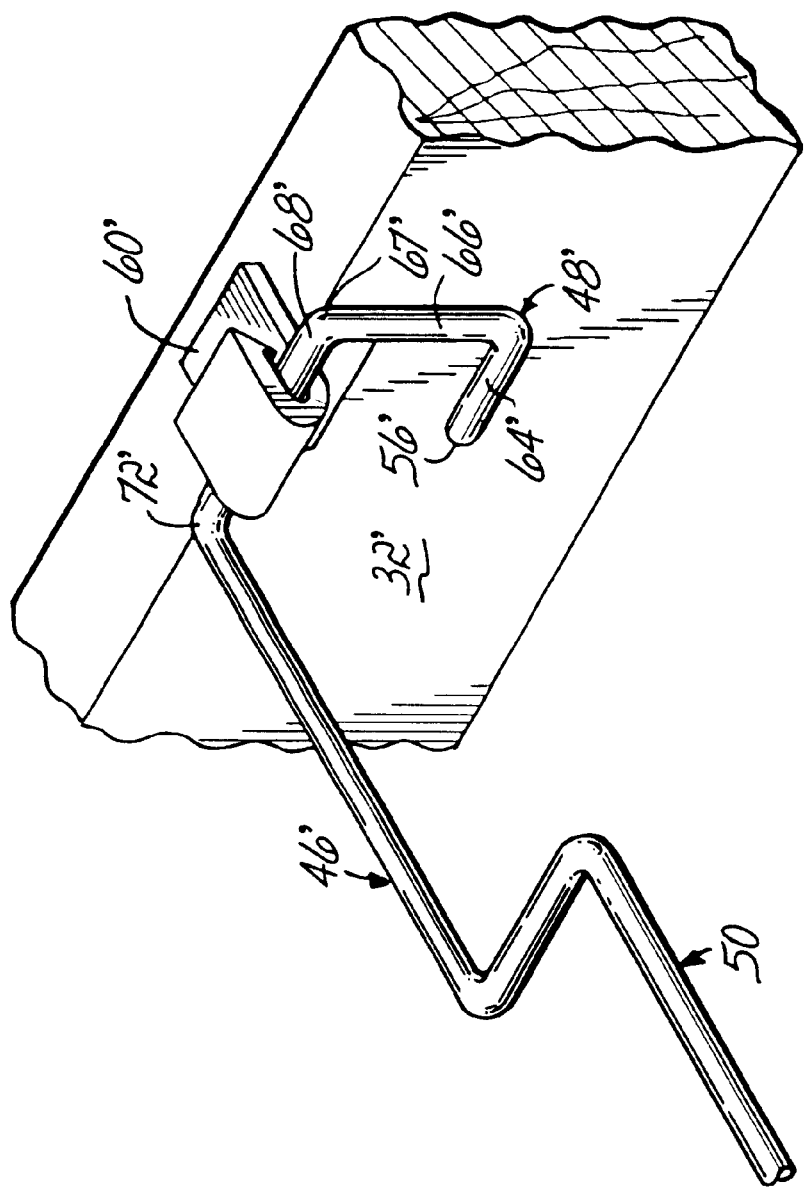
FIG. 5A is an enlarged view of the front of one of the modular springs of the alternative embodiment.

FIGS. 5 and 5A illustrate an alternative embodiment of the present invention. For the sake of simplicity, all the components of the alternative embodiment which are identical to the components of the preferred embodiment have the same numerical designation. This alternative embodiment of the present invention is what is described in the industry as a "hard edge" seat assembly, whereas the preferred embodiment is referred to in the industry as a "soft edge" seat assembly.

As best illustrated in FIG. 5, the alternative embodiment of the present invention has a front rail 32' of a height H' which is greater than the height H of the front rail 32 of the preferred embodiment. A clip 60' is secured to the upper edge 62' of the front rail 32'.

Each modular spring 46' of this alternative embodiment does not have a resilient front section 48 but rather has a front section 48' secured to the front rail 32' by clip 60'. As illustrated in FIG. 5A, the front section 48' has a front end 56'. The front section 48' comprises an end bar 64', a first longitudinal bar 66', and a first transverse bar 68' extending inwardly from a junction 67' and terminating at junction 72'. The first transverse bar 68' is engaged with the clip 60' as illustrated in FIG. 5A. The front connecting section, the resilient center section and the rear section are all identical to that of the modular spring 48 illustrated in FIGS. 1–4C. However, the front section 48' of each modular spring 46' of this alternative embodiment is still preloaded but is not as resilient as the front section of the modular spring of the preferred embodiment of the present invention because the front section does not extend downwardly to the same extent.

While I have described only two preferred embodiments of my invention, other changes and modifications will be apparent to those skilled in the art. Therefore, I do not intend to be limited except by the scope of the following claims.

I claim:

1. A seat assembly comprising:
   a generally rectangular seat frame including a front rail, a rear rail, a pair of opposed side rails,
   a center rail extending between said opposed side rails,
   a plurality of modular springs secured to said frame, each of said modular springs being made of a single length of wire and having a front section, a front connecting section, a resilient center section and a rear section, said front section being secured to said front rail, said resilient center section being secured to said center rail, said front connecting section extending between said front section and said resilient center section, and said rear section being cantilevered rearwardly from said resilient center section of said modular spring.

2. The seat assembly of claim 1 wherein said front connecting section of each of said modular springs is generally planar between said resilient center section and front section.

3. The seat assembly of claim 1 further comprising a plurality of front clips secured to said front rail, each of said front sections of said modular springs being engaged with one of said front clips.

4. The seat assembly of claim 1 further comprising a grid secured to said modular springs.

5. The seat assembly of claim 1 wherein each of said modular springs has a generally square wave form along its length.

6. The seat assembly of claim 1 where at least one of said modular springs further comprises a stiffener extending between a pair of opposed legs of said resilient center section of said modular spring.

7. The seat assembly of claim 1 wherein said resilient center section of each of said modular springs comprises a pair of opposed diverging leg bars extending downwardly from said front connecting section and from said rear section of said spring, said downwardly diverging leg bars being connected at their lower ends to one end of pair of opposed middle transverse bars of said modular springs, said pair of opposed middle transverse bars each having another end connected to a converging lower leg bar of said resilient center section, which converging lower leg bars are connected at their lower ends to a bottom bar.

8. The seat assembly of claim 7 wherein each of said bottom bars is connected to said center rail of said seat frame.

9. The seat assembly of claim 8 wherein each of said pairs of opposed middle transverse bars of each of said resilient center sections is interconnected by a stiffener.

10. A seat assembly comprising:
    a generally rectangular frame including a front rail, a rear rail, and a pair of opposed side rails,
    a center rail extending between said opposed side rails parallel said front and rear rails,
    at least one modular spring secured to said frame, each modular spring being a single length of wire and having a square wave form between a front end and a rear end, said modular spring further having a resilient front section, a resilient center section and a rear section, said resilient front section being secured to said front rail of said frame, said resilient center section being secured to said center rail of said frame and said rear section of said modular spring being unattached to any of said rails.

11. The seat assembly of claim 10 wherein said modular spring is generally planar other than said resilient center and front sections.

12. The seat assembly of claim 10 further comprising a front clip secured to said front rail, said resilient front section of said modular spring being engaged with said front clip and contacting an inside surface of said front rail.

13. The seat assembly of claim 10 further comprising a grid secured to said modular spring.

14. The seat assembly of claim 10 wherein said modular spring has a lowermost transverse section which is secured to said center rail of said frame.

15. The seat assembly of claim 10 further comprising a stiffener extending between a pair of opposed legs of said resilient center section of said modular spring.

16. A seat assembly comprising:
    a generally rectangular frame including a front rail, a rear rail, a pair of opposed side rails,
    a center rail extending between said opposed side rails parallel said front and rear rails and at least one stretcher rail, each stretcher rail extending between said front and rear rails,
    a modular spring having a square wave form, said modular spring being a single length of wire and having a front end, a rear end, a front section, a resilient center section and a rear section, said front section being engaged with a clip secured to said front rail, said resilient center section being secured to said center rail and said rear section of said modular spring being unattached to any of said rails of said frame and spaced above said frame in order to increase the resiliency of a rear portion of said seat.

17. The seat assembly of claim 16 wherein said modular spring is generally planar other than said resilient center section and said front section.

18. The seat assembly of claim 16 wherein said front end of said modular spring contacts an inside surface of said front rail, causing said modular spring to be preloaded.

19. The seat assembly of claim 16 further comprising a grid secured to said modular spring.

20. The seat assembly of claim 16 wherein said modular spring has a bottom bar which is secured to said center rail of said frame.

21. The seat assembly of claim 16 further comprising a stiffener extending between a pair of opposed legs of said resilient center section of said modular spring.

22. The seat assembly of claim 16 wherein said frame is made of wood.

23. The seat assembly of claim 16 wherein said modular spring is made of one piece of wire formed into a plurality of longitudinal sections and a plurality of transverse sections.

24. A modular spring for use in a seat assembly having a generally rectangular frame comprising a front rail, a rear rail, a pair of opposed side rails, a center rail extending between said opposed side rails parallel said front and rear rails, said modular spring being made of a single length of wire and having a front end, a rear end, a front section, a resilient center section and a rear section, said front section being adapted to be secured to said front rail and said resilient center section being adapted to be secured to said center rail, said rear section of said modular spring being cantilevered from said resilient center section and being adapted to extend above and be unattached to said rails of said frame.

* * * * *